US009767626B2

United States Patent
Makke et al.

(10) Patent No.: US 9,767,626 B2
(45) Date of Patent: Sep. 19, 2017

(54) CONNECTED SERVICES FOR VEHICLE DIAGNOSTICS AND REPAIRS

(71) Applicant: Ford Global Technologies, LLC, Dearborn, MA (US)

(72) Inventors: Omar Makke, Lyon Township, MI (US); Oleg Yurievitch Gusikhin, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/795,459

(22) Filed: Jul. 9, 2015

(65) Prior Publication Data

US 2017/0011561 A1    Jan. 12, 2017

(51) Int. Cl.
  *G07C 5/00*    (2006.01)
  *H04W 12/06*   (2009.01)
  (Continued)

(52) U.S. Cl.
  CPC ............ *G07C 5/008* (2013.01); *B60Q 1/0076* (2013.01); *B60T 7/16* (2013.01); *B60T 17/221* (2013.01);
  (Continued)

(58) Field of Classification Search
  CPC ...... G08C 17/00; G07C 5/008; G07C 5/0808; G07C 5/085; H04W 12/06; H04W 84/12; F02D 41/22
  See application file for complete search history.

(56) References Cited

U.S. PATENT DOCUMENTS 7,672,763 B1 *  3/2010  Hunt ................... B60R 16/0207
                                                              701/33.2
8,311,507 B2 * 11/2012  Wheatley ............... G07C 5/008
                                                              455/343.6
(Continued)

FOREIGN PATENT DOCUMENTS

DE    EP 2680534 A1 *  1/2014  ........... H04L 41/069
JP    2009264828 A  * 11/2009  ............ B60W 50/02

OTHER PUBLICATIONS

Petr et al., "Online diagnostic and control unit of vehicle induction motor based on TMS320F28335 DSP," Year: 2010, pp. T9-66-T9-71.*

(Continued)

*Primary Examiner* — Tuan C. To
(74) *Attorney, Agent, or Firm* — Jennifer M. Stec; Brooks Kushman P.C.

(57) ABSTRACT

A mobile device may authorize with a paired telematics control unit of a vehicle to ensure the vehicle is in a remote service mode; send a command request to the telematics control unit requesting an operation to be automatically performed by a vehicle electronic control unit in place of manual input by an assistant; and receive diagnostic data from the vehicle electronic control unit via the telematics control unit. The telematics control unit may query electronic control units of the vehicle to identify whether the vehicle is in a mode in which commands from a remote service application of a mobile device can be processed; indicate the mode to the application; and receive the command request requesting a service operation to be automatically performed by one of the electronic control units.

20 Claims, 8 Drawing Sheets

(51) Int. Cl.
  *G07C 5/08*    (2006.01)
  *F02D 41/26*   (2006.01)
  *B60T 7/16*    (2006.01)
  *B60Q 1/00*    (2006.01)
  *H04W 76/02*   (2009.01)
  *F02D 41/10*   (2006.01)
  *B60T 17/22*   (2006.01)
  *F16D 65/00*   (2006.01)
  *F02D 41/22*   (2006.01)
  *H04W 84/12*   (2009.01)

(52) U.S. Cl.
  CPC ............ *B60T 17/222* (2013.01); *F02D 41/22* (2013.01); *F16D 65/0043* (2013.01); *G07C 5/085* (2013.01); *G07C 5/0808* (2013.01); *G07C 5/0825* (2013.01); *H04W 12/06* (2013.01); *H04W 84/12* (2013.01)

(56) References Cited

U.S. PATENT DOCUMENTS

| | | | | |
|---|---|---|---|---|
| 8,897,953 | B2* | 11/2014 | Olsen, III | G05B 23/0283 701/29.6 |
| 9,401,845 | B2* | 7/2016 | Cazanas | H04L 41/082 |
| 2004/0185842 | A1* | 9/2004 | Spaur | B60R 25/04 455/420 |
| 2004/0198466 | A1* | 10/2004 | Walby | G06F 1/3209 455/574 |
| 2005/0182534 | A1* | 8/2005 | Legate | G07C 5/008 701/31.4 |
| 2008/0172147 | A1* | 7/2008 | Taki | B60R 25/2018 701/2 |
| 2010/0136944 | A1* | 6/2010 | Taylor | B60R 25/00 455/404.1 |
| 2011/0039528 | A1* | 2/2011 | Yi | G08G 1/20 455/418 |
| 2012/0053778 | A1* | 3/2012 | Colvin | G07C 5/008 701/29.4 |
| 2013/0247554 | A1 | 9/2013 | Cooper et al. | |
| 2013/0304278 | A1 | 11/2013 | Chen | |
| 2014/0213238 | A1* | 7/2014 | Giraud | G07C 5/008 455/418 |
| 2014/0335902 | A1* | 11/2014 | Guba | H04W 4/027 455/456.4 |
| 2014/0343751 | A1* | 11/2014 | Berkobin | G07C 5/008 701/1 |
| 2015/0094929 | A1 | 4/2015 | Bell | |
| 2015/0180710 | A1* | 6/2015 | Cazanas | H04L 41/082 709/221 |
| 2016/0018798 | A1* | 1/2016 | Jiang | G05B 15/02 700/275 |
| 2016/0056970 | A1* | 2/2016 | Yabe | G08C 17/00 709/225 |
| 2016/0057511 | A1* | 2/2016 | Mullins | G08C 17/00 340/870.07 |
| 2016/0110929 | A1* | 4/2016 | Park | H04W 76/02 701/31.4 |
| 2016/0142410 | A1* | 5/2016 | Mazzara, Jr. | H04W 12/08 726/4 |

OTHER PUBLICATIONS

Doo et al., "A study on the vehicular wireless base-station for in-vehicle wireless sensor network system," Year: 2014, pp. 609-610.*

* cited by examiner

CONNECTED SERVICES FOR VEHICLE DIAGNOSTICS AND REPAIRS

TECHNICAL FIELD

Aspects of the disclosure generally relate to connected services for vehicle diagnostics and vehicle repair.

BACKGROUND

Some vehicle repairs are easily performed by one person. For example, one would typically not require a helper to replace a headlight or wiper blade. Other vehicle repairs are difficult for an unaided individual to perform. For instance, it may be difficult for an individual to both press a brake pedal during brake pad replacement to prevent air bubbles from entering vehicle brake lines and also perform the brake repair. As another example, it may be difficult for an individual to manipulate engine throttle settings while also listening or watching to diagnose an engine issue. When the assistant is not present, some repairs may be difficult for the unaided individual to perform.

SUMMARY

In a first illustrative embodiment, a system includes a mobile device, external to a vehicle, configured to authorize with a paired vehicle telematics control unit (TCU) to ensure permission to enter a vehicle remote service mode; send a command request to the TCU requesting an operation to be automatically performed by a vehicle electronic control unit (ECU) in place of input to in-cabin vehicle controls; and receive diagnostic data from the vehicle ECU via the TCU.

In a second illustrative embodiment, a system includes a plurality of electronic control units (ECUs) of a vehicle; and a telematics control unit of the vehicle, configured to query the ECUs to confirm the vehicle is in a remote service mode in which command requests from a remote service application of a mobile device external to the vehicle can be processed; indicate the mode to the application; and receive a command request from the application to perform a service operation.

In a third illustrative embodiment, a computer-implemented method includes confirming that a remote service application installed to a mobile device connected to a telematics control unit of a vehicle is authorized to command the vehicle in a remote service mode; confirming that a service request received from the mobile device requesting an operation to be performed by a vehicle electronic control unit is permissible within the mode; and sending diagnostic data to the mobile device when performing the service request.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A remote service application may be installed to a mobile device of a user. When the mobile device is paired with a vehicle, the vehicle may confirm that the remote service application is authorized for use with the vehicle. If so confirmed, the remote service application may be used to perform helper operations when performing repairs or diagnostics of the vehicle. These helper operations may include the configuration of vehicle actuators from the remote service application while the user is outside the vehicle. Thus, the remote service application may allow the unaided individual to perform vehicle repairs that might otherwise require the use of an assistant within the vehicle (e.g., an assistant operating vehicle controls within the vehicle cabin). In an example, the remote service application may allow the user to command the brakes be pressed to bleed brake lines during a brake pad replacement. In another example, the remote service application may allow the user to command an engine throttle when diagnosing the engine. In yet a further example, the remote service application may allow the user to engage or disengage brake, reverse, or turn signal lights to allow for evaluation of bulbs for replacement.

The systems of the vehicle may further perform verifications in order to allow the remote service application to command vehicle systems. In an example, the vehicle may be configured to ensure that the vehicle is in a state appropriate for the performance of repair or diagnostic actions, such as in Park, and/or with the vehicle hood unlatched. In another example, the vehicle may query the vehicle control units to ensure that the control units allow for the vehicle to accept commands from the remote service application. Moreover, the system may implement commands filters to prevent commands from being requested by the remote service application that could place the vehicle in a state inappropriate for the performance of repair or diagnostic actions, such as filtering out requests commanding an electric vehicle to switch out of Park, releasing a parking brake, commanding a park-pawl actuator, or other operations related to putting the vehicle in a motive or potentially motive state.

When the remote service application is verified to be allowed to command the vehicle systems, the remote service application may also be configured to provide vehicle diagnostic information over a communications network to a remote server. The transfer may be performed, in an example, using a connection to the network available to the mobile device executing the remote service application. In many cases, the repairs may be perform at a location having a local wireless network (e.g., a Wi-Fi network) to which the mobile device may be connected, facilitating the easy transfer of diagnostic data to the remote server without incurring cellular data charges to an in-vehicle modem (of so equipped) or to the mobile device.

Figure 1:
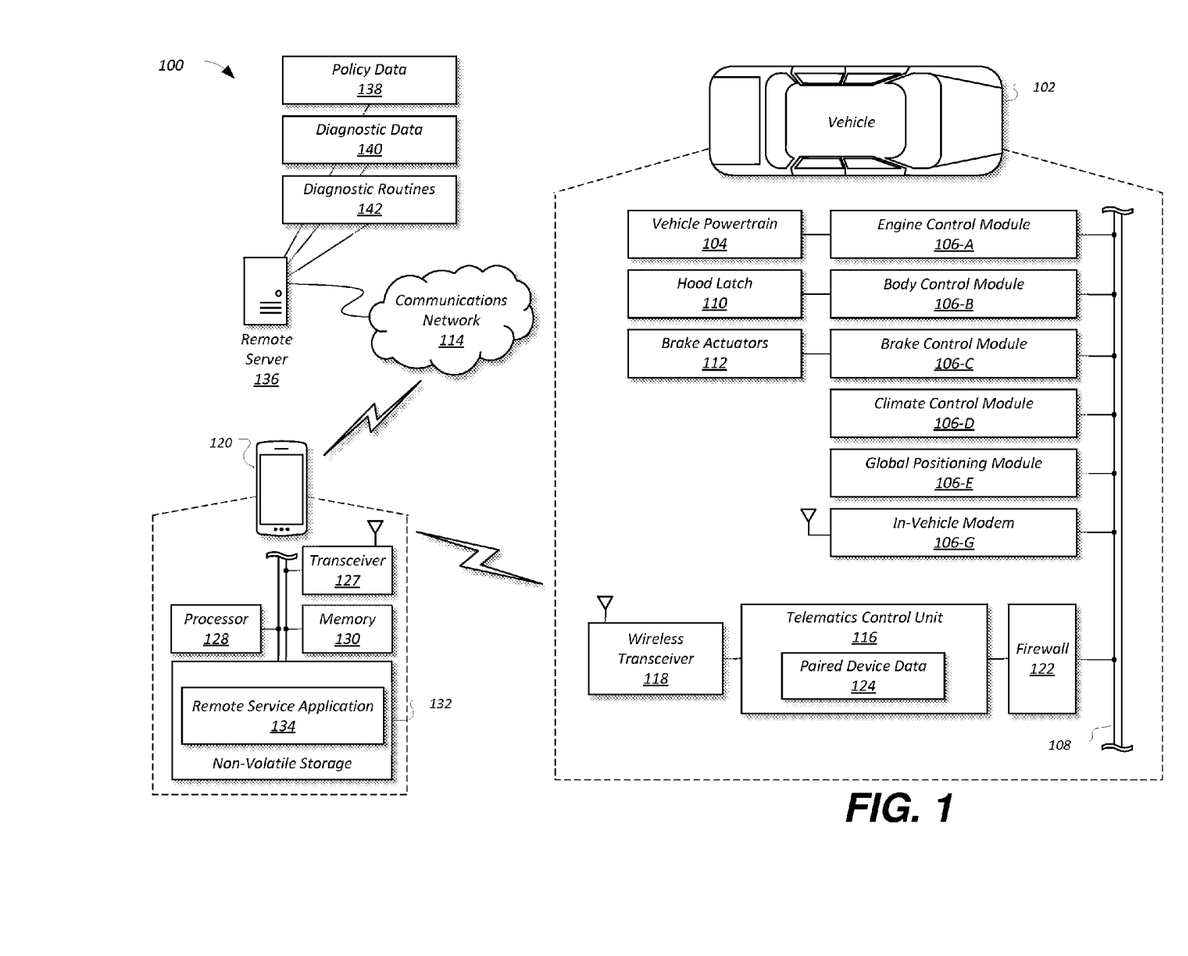
FIG. 1 illustrates an example system including a vehicle configured to utilize a remote service application.

FIG. 1 illustrates an example system 100 including a vehicle 102 configured to utilize a remote service application 134. As illustrated, the vehicle 102 includes a vehicle powertrain 104 connected to one or more vehicle wheels to propel the vehicle, and a plurality of vehicle ECUs 106 in communication over one or more vehicle buses 108 to control the vehicle powertrain 104 and other vehicle 102 functions, such as a vehicle hood latch 110 or brake actuators 112. The vehicle 102 also includes a telematics control unit 116 configured to communicate with paired mobile devices 120 via a wireless transceiver 118 and connected to the vehicle bus 108 through a firewall 122. The system 100 also includes a mobile device 120 having a remote service application 134 and in communication with a remote server 136 over a communications network 114. The remote server 136 may provide policy data 138 to the telematics control unit 116 for use in authorizing the remote service application 134 for use with the vehicle 102, may provide diagnostic routines 142 to the vehicle 102 for generation of diagnostic data 140, and may receive diagnostic data 140 from the vehicle 102. While an example system 100 is shown in FIG. 1, the example components illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people and/or goods. The vehicle powertrain 104 may include one or more engines or motors configured to supply the motive force to propel the vehicle 102. In an example, the vehicle 102 may be powered by an internal-combustion engine coupled to the drive wheels via a transmission to a differential. In another example, the vehicle 102 may be a hybrid electric vehicle (HEV) powered by both an internal combustion engine and one or more electric motors, such as a series hybrid electric vehicle (SHEV), a parallel hybrid electrical vehicle (PHEV), a parallel/series hybrid electric vehicle (PSHEV), or a compressed natural gas (CNG) engine vehicle. As the type and configuration of vehicle 102 may vary, the capabilities of the vehicle 102 may correspondingly vary. As some other possibilities, vehicle 102 may have different capabilities with respect to cargo capacity, passenger capacity, and towing ability.

The vehicle 102 may include a plurality of electronic control units (ECUs) 106 configured to perform and manage various vehicle 102 functions under the power of the vehicle battery and/or drivetrain. As depicted, the example vehicle ECUs 106 are represented as discrete ECUs 106-A through 106-G. However, the vehicle ECUs 106 may share physical hardware, firmware, and/or software, such that the functionality from multiple ECUs 106 may be integrated into a single ECU 106, and that the functionality of various such ECUs 106 may be distributed across a plurality of ECUs 106. The vehicle ECUs 106 may include various vehicle 102 components configured to receive updates of associated software, firmware, or configuration settings.

For example, an engine control ECU 106-A may be configured to provide for monitoring and control of the vehicle powertrain 104. A body control ECU 106-B may manage various power control functions such as exterior lighting, interior lighting, keyless entry, a hood latch 110 to the engine bay, remote start, and point of access status verification. A brake control module 106-C may be configured to communicate brake actuators 112 or other vehicle 102 safety systems. A climate control management ECU 106-E may be configured to provide control of heating and cooling system components (e.g., compressor clutch, blower fan, temperature sensors, etc.) to manage climate in cargo and/or passenger compartments. A global positioning system (GPS) ECU 106-F may be configured to provide vehicle location information.

The vehicle bus 108 may include various method of communication available between the vehicle ECUs 106. As some non-limiting examples, the vehicle bus 108 may include one or more of a vehicle controller area network (CAN), an Ethernet network, and a media oriented system transfer (MOST) network.

Some vehicle 102 configurations may include an in-vehicle modem 106-G or other network hardware configured to facilitate communication over the communications network 114 between the vehicle 102 and other devices of the system 100. The communications network 114 may include one or more interconnected communication networks such as the Internet, a cable television distribution network, a satellite link network, a local area network, a wide area network, and a telephone network, as some non-limiting examples.

The telematics control unit 116 may be configured to provide telematics services to the vehicle 102. These services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich.

To support these and other telematics service, the telematics control unit 116 may utilize network hardware configured to facilitate communication between the vehicle ECUs 106 and with other devices of the system 100. In an example, the telematics control unit 116 may interface with a wireless transceiver 118 configured to communicate over one or more of Bluetooth, Wi-Fi, and wired USB with a mobile device 120 of a user. To ensure secure functional separation of the telematics control unit 116 from the vehicle bus 108 communications of the vehicle ECUs 106, the telematics control unit 116 may be configured to access the vehicle bus 108 through a firewall 122. Moreover, the firewall 122 may implement a command filter to prevent commands from being requested by the remote service application 134 that could place the vehicle 102 in a state inappropriate for the performance of repair or diagnostic actions, such as filtering out requests commanding an electric vehicle 102 to switch out of Park, releasing a parking brake, commanding a park-pawl actuator, or other operations related to putting the vehicle 102 in a motive or potentially motive state.

A mobile device 120 may undergo a process the first time the mobile device 120 is connected to the telematics control unit 116, in which the telematics control unit 116 scans for mobile devices 120, and the user manually confirms an identification of the mobile device 120 to be connected to the telematics control unit 116. This process may be referred to as pairing. The telematics control unit 116 may maintain paired device data 124 indicating device identifiers or other information regarding mobile devices 120 that have been previously paired with the telematics control unit 116. Accordingly, once the pairing process is performed, the telematics control unit 116 may utilize the paired device data 124 to automatically reconnect to the mobile device 120 when the mobile device 120 is identified via the wireless transceiver 118 as being in proximity of the telematics control unit 116.

The mobile devices 120 may be any of various types of portable computing device, such as cellular phones, tablet computers, smart watches, laptop computers, portable music players, or other devices capable of communication over the communications network 114. In an example, the mobile devices 120 may communicate with the communication network 114 and with the wireless transceiver 118 of the vehicle 102 using a modem or transceiver 126. The mobile devices 120 may include one or more processors 128 configured to execute instructions of mobile applications loaded to a memory 130 of the mobile device 120 from storage medium 132 of the mobile device 120. The remote service application 134 may be an example of a mobile application installed to the mobile device 120. The remote service application 134 may be configured to receive input (e.g., user input to a user interface of the mobile device 120), and send commands to the vehicle 102 via the telematics control unit 116, as discussed in greater detail below.

The remote server 136 may include various types of computing apparatus, such as a computer workstation, a server, a desktop computer, a virtual server instance executed by a mainframe server, or some other computing system and/or device. Similar to the mobile device 120, the remote server 136 may generally include a memory 130 on which computer-executable instructions may be maintained, where the instructions may be executable by one or more processors 128 (not shown for clarity). Such instructions and other data may be stored using a variety of computer-readable media. A computer-readable medium (also referred to as a processor-readable medium or storage 132) includes any non-transitory (e.g., tangible) medium that participates in providing data (e.g., instructions) that may be read by a computer (e.g., by the processor 128 of the remote server 136 or mobile device 120). In general, processors 128 receives instructions, e.g., from the memory 130 via the computer-readable storage medium 132, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Objective C, Fortran, Pascal, Visual Basic, Java Script, Perl, Python, PL/SQL, etc. In an example, the remote server 136 may be configured to maintain the policy data 138, the diagnostic data 140 received from the telematics control unit 116 of the vehicles 102 by way of the network 114, and the diagnostic routines 142 provided to the vehicles 102.

The policy data 138 may include information indicative of application permissions for connected applications installed to a user's paired mobile device 120. This may allow for remote configuration, via the remote server 136, of which applications and/or which paired mobile devices 120 have permission to access what systems of which vehicles 102. For those mobile applications and mobile devices 120 that have permission, the policy data 138 may further include information descriptive of what features or vehicle functions the applications or devices can access (e.g., what operations are permissible within the remote service mode). The remote server 136 may be configured to send the policy data 138 to the telematics control unit 116 of the vehicle 102 to allow the telematics control unit 116 to validate permission of the mobile application to utilize the vehicle 102, and further to secure user consent and user notification before allowing use of the connected applications. In an example, the policy data 138 may include information regarding the permissions of the remote service application 134.

The diagnostic data 140 may include, as some non-limiting examples, accelerator pedal position, steering wheel angle, vehicle speed, vehicle location (e.g., GPS coordinates, etc.), vehicle unique identifier (e.g., VIN), engine revolutions per minute (RPM), and vehicle HMI information, such as steering wheel button press information. In an example, the telematics control unit 116 may be programmed to collect information from the ECUs 106, package the information into the diagnostic data 140, and provide the diagnostic data 140 to the remote server 136 over the communications network 114. For instance, the telematics control unit 116 may receive a diagnostic routine 142 from the remote server 136 and may execute the diagnostic routine 142 to generate specific diagnostic data 140 to send to the remote server 136. As one example, the diagnostic routine 142 may be a "spark health" route specifying for the vehicle 102 to provide oxygen sensor and fuel measurement information in the diagnostic data 140, and the remote server 136 may receive the diagnostic data 140 for analysis. The analysis may include, for example, a comparison of the data generated by the diagnostic routine 142 with predefined curves to give a probabilistic diagnosis of the vehicle 102 spark plug health.

Variations on the system 100 are possible. As an alternate to use of the telematics control unit 116 for data communication with the vehicle bus 108, the system 100 may utilize a bridge device (not shown) to allow the mobile device 120 to access the vehicle bus 108. The bridge device may include a dongle or other connector configured to connect to an information port of the vehicle 102, such as to an On-Board Diagnostic (OBD-II) port in an example. The bridge device may further be connected to the mobile device 120 via a BLUETOOTH another wireless or wired data connection. When the bridge device is authorized to access the vehicle bus 108, e.g., due to being connected to a mobile device 120 that is successfully paired to the telematics control unit 116, the bridge device may be configured to facilitate data communication between the mobile device 120 and the vehicle bus 108 to perform the data capture and helper operations described in detail herein. To ensure security, in many examples the data communication of the bridge device with the vehicle bus 108 may be through the firewall 122, or through other vehicle 102 component(s) performing the operations of the firewall 122.

Figure 2:
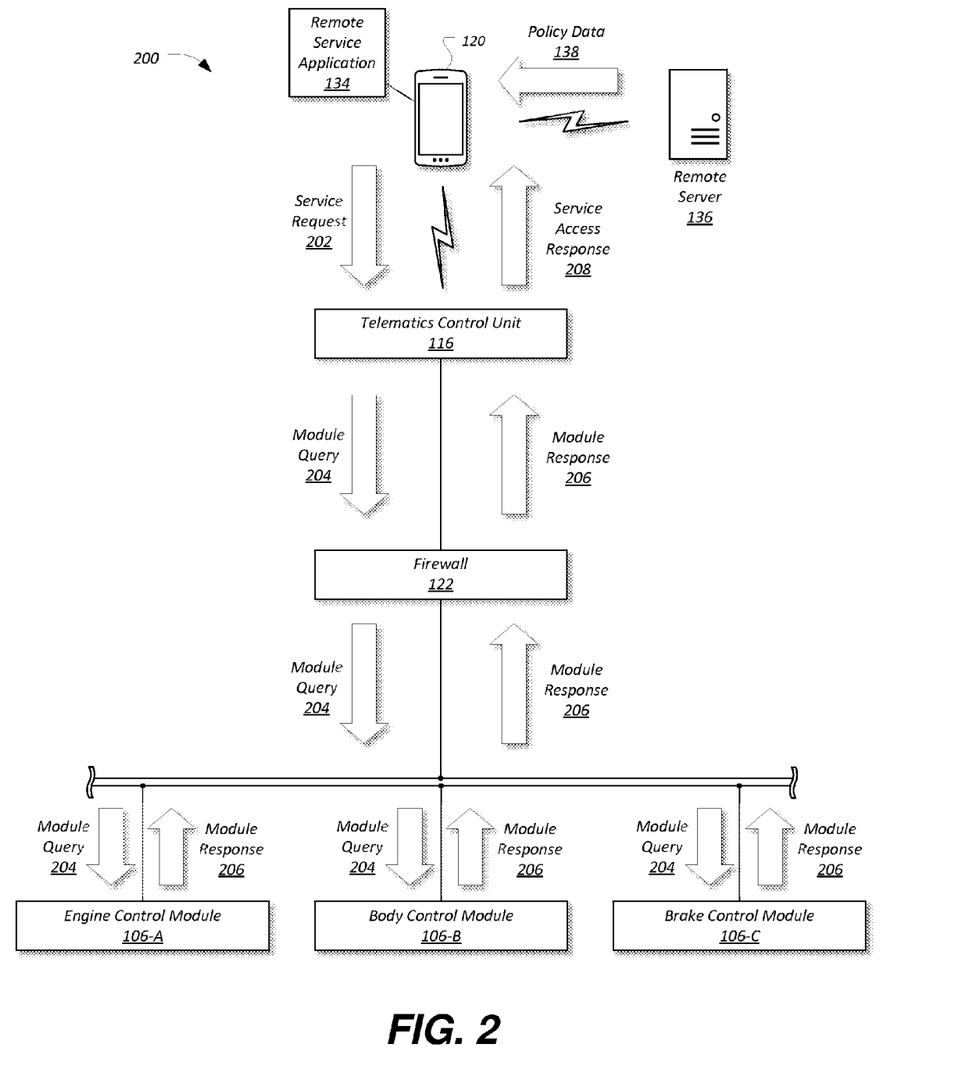
FIG. 2 illustrates an example data flow for authorization of the remote service application.

FIG. 2 illustrates an example data flow 200 for authorization of the remote service application 134. The data flow 200 may be initiated, in an example, responsive to a user initiating the remote service application 134 for access to the telematics control unit 116 of the vehicle 102 to be commanded.

The vehicle 102 may maintain the policy data 138 for use in validating mobile applications. In some examples, the policy data 138 may be maintained in a storage of the telematics control unit 116. In another example, the policy data 138 may be from the remote server 136 to the vehicle 102 via the user's mobile device 120 that is paired with the vehicle 102 and executing the mobile applications. Each connected mobile application installed to the user's paired mobile device 120 may be associated with an application identifier (e.g., provided from the vehicle manufacturer or other identifier management authority).

When the remote service application 134 registers in-vehicle with the telematics control unit 116, the remote service application 134 passes along the application identifier associated with the remote service application 134. The telematics control unit 116 may then check the policy data 138 for the application policy associated with the provided application identifier. The policy data 138 may dictate whether the remote service application 134 is allowed to run connected to the vehicle 102, and if so, which vehicle functions may be accessed by the remote service application 134. The telematics control unit 116 may accordingly utilize the policy data 138 to authorize the remote service application 134 for use with the vehicle 102. In some cases, if the application identifier cannot be located in the policy data 138 of the vehicle 102, then the vehicle 102 may query the remote server 136 for updated policy data 138.

Once authorized, the remote service application 134 may send a service request 202 to the telematics control unit 116 to initiate functioning of the command and diagnostic functions of the remote service application 134. Responsive to the service request 202, the telematics control unit 116 may check the vehicle 102 state in order confirm that the vehicle 102 is in a mode appropriate for execution of the remote service application 134. For example, the telematics control unit 116 may send a module query message 204 through the firewall 122 and via the vehicle buses 108 to the vehicle ECUs 106, to allow the vehicle ECUs 106 to confirm or reject that the vehicle 102 is in a state suitable for use of the remote service application 134. These confirmations or rejections may be referred to as module responses 206, and may be returned to the telematics control unit 116 via the vehicle buses 108 through the firewall 122.

In an example, the body control module 106-B may receive the module query message 204, and may confirm whether the hood latch 110 is in an open state. If the hood latch 110 is open, the body control module 106-B may return an affirming module response 206, but if the hood latch is closed, the body control module 106-B may return a rejecting module response 206. In another example, the engine control module 106-A (or a transmission control module) may confirm that the vehicle 102 is in Park, and may return an affirming module response 206 if the vehicle 102 is in park and a rejecting module response 206 if not. In yet another example, the brake control module 106-C may monitor wheel speed sensors and may identify whether the vehicle 102 is moving or is remaining parked. In another possibility, the transmission control module may monitor clutch positions to confirm that the Park gear is engaged mechanically.

If the telematics control unit 116 receives affirming module responses 206, the telematics control unit 116 may approve use of the remote service application 134. If, however the telematics control unit 116 receives one or more module responses 206 rejecting use of the remote service application 134, then the telematics control unit 116 may deny use of the remote service application 134. The telematics control unit 116 may return the approval or denial of use of the remote service application 134 the remote service application 134 via a service access response 208, responsive to the service request 202.

Figure 3:
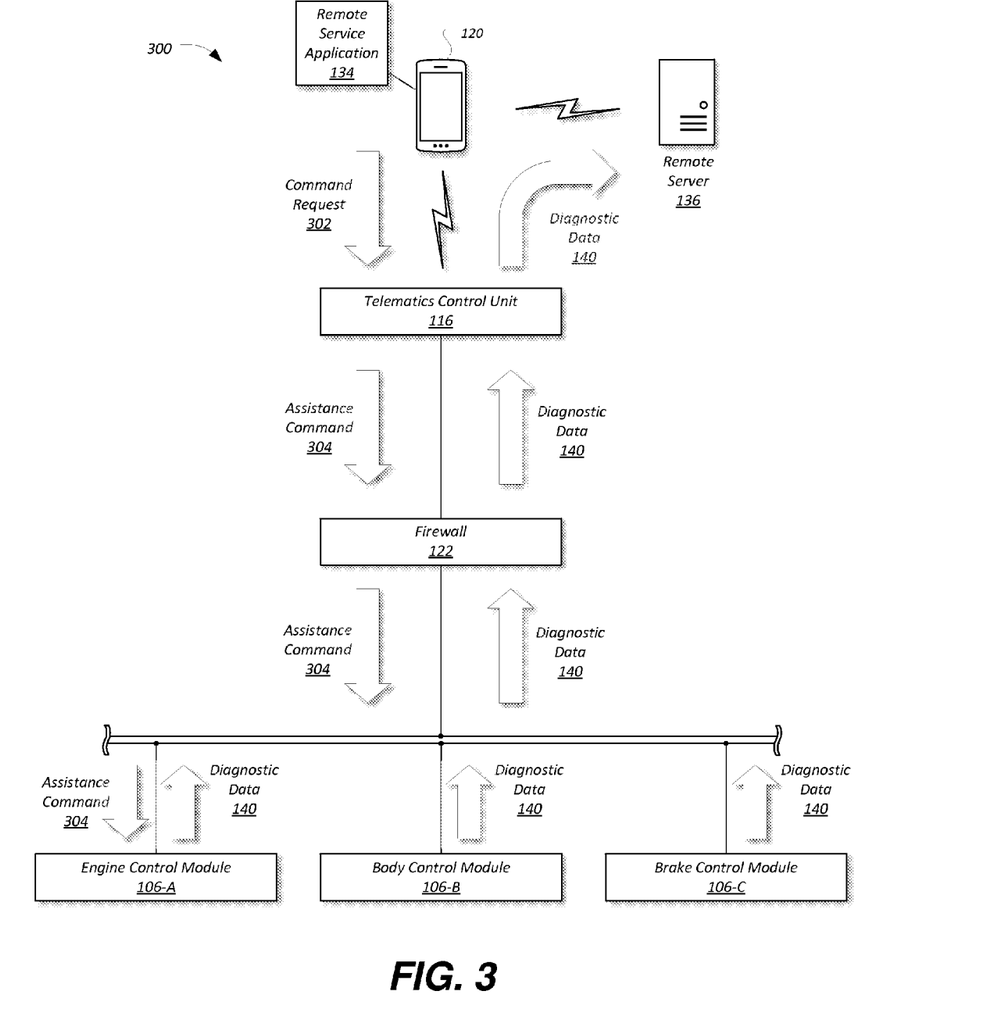
FIG. 3 illustrates an example data flow for use of the remote service application when the vehicle is in the remote service mode.

FIG. 3 illustrates an example data flow 300 for use of the remote service application 134 when the vehicle 102 is in the remote service mode. The data flow 300 may be initiated, in an example, responsive to the telematics control unit 116 authorizing the remote service application 134 for access to the telematics control unit 116 and confirming the vehicle 102 state as suitable for being commanded by the remote service application 134.

The remote service application 134 may provide a user interface from which the user may select command requests to the telematics control unit 116. In an example, the user interface may allow for the user to select a command request 302 to adjust the brake actuators 112. In another example, the user interface may allow for the user to select a command request 302 to adjust the throttle of the vehicle powertrain 104. Further details of an example user interface are discussed below with respect to FIGS. 4A-4D.

The remote service application 134 may send the selected command request 302 to the telematics control unit 116 for processing. The telematics control unit 116 may accordingly generate an assistance command 304 configured to request the selected action of the appropriate vehicle ECU 106, and may provide the assistance command 304 to the firewall 122. The firewall 122 may, in turn, provide the assistance command 304 to the vehicle bus 108 as the vehicle 102 is in the remote service mode, to be received by the appropriate vehicle ECU 106. In the illustrated example, the remote service application 134 sends an assistance command 304 to the engine control module 106-A, although other examples are possible.

Moreover, the firewall 122 may be further configured to provide diagnostic data 140 from the vehicle ECUs 106 back to the telematics control unit 116 while the vehicle 102 is in the remote service mode. The telematics control unit 116 may receive the diagnostic data 140 from the vehicle ECUs 106, and may send the diagnostic data 140 to the remote server 136 for analysis and/or storage. In many cases, the remote service application 134 may be utilized at a location having a local wireless network (e.g., a Wi-Fi network) to which the mobile device 120 may be connected, facilitating the easy transfer of the diagnostic data 140 to the remote server 136 without incurring cellular data charges to an in-vehicle modem (of so equipped) or to the mobile device 120. Thus, the diagnostic data 140 monitoring functionality may allow the user to perform a detailed review the operation of the vehicle 102 for troubleshooting or other purposes.

Figure 4A:
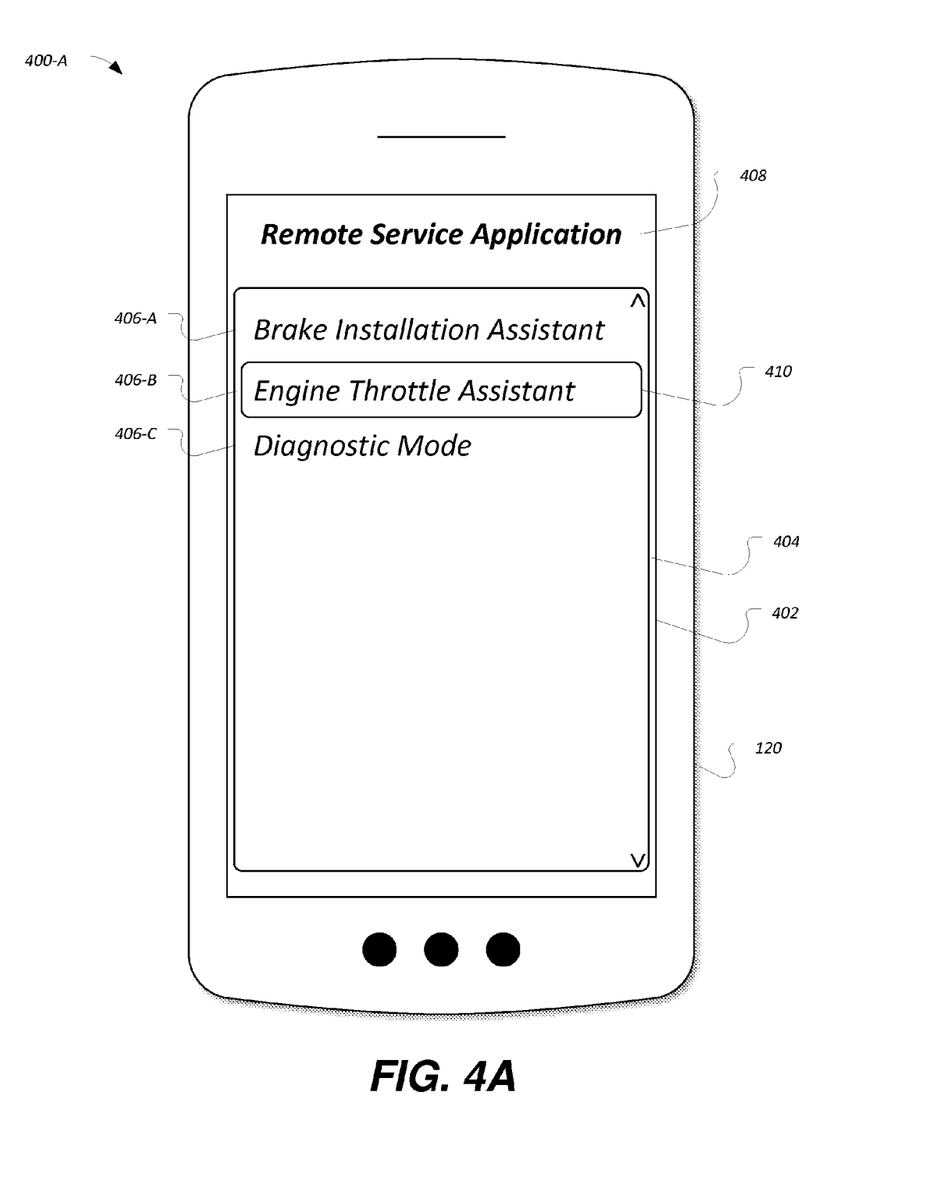
FIG. 4A illustrates an example user interface of the remote service application displaying a main menu.

FIG. 4A illustrates an example user interface 400-A of the remote service application 134 displaying a main menu. As shown, the user interface 400-A may be presented by the remote service application 134 on a display 402 of the mobile device 120, and may include a list control 404 configured to display selectable list entries 406-A through 406-C (collectively 406) of the remote service application 134 features. Each of the selectable list entries 406 may indicate a feature of the remote service application 134 available for use by the user. The user interface 400 may also include a title label 408 to indicate to the user that the user interface 400 is displaying a menu of options of the remote service application 134.

As illustrated, the list control 404 of the remote service application 134 includes an entry 406-A for a brake installation assistant, an entry 406-B for an engine throttle assistant, and an entry 406-C for a diagnostic-only mode. The list control 404 may operate as a menu, such that a user of the user interface 400-A may be able to scroll through list entries of the list control 404 (e.g., using up and down arrow buttons and a select button to invoke the selected menu item 410). In some cases, the list control 404 may be displayed on a touch screen such that the user may be able to touch the list control 404 to select and invoke a menu item. As another example, the user interface 400-A may support voice command selection of the menu items. For example, to invoke the engine throttle assistant, the user may speak the voice command "engine throttle assistant." It should be noted that the illustrated entries 406 are merely examples, and more or different options may be available. As another example, the options of the remote service application 134 may include a light check assistant configured to allow the user to activate brake lights, turn signal lights, reversing lights, etc., without requiring an assistant to manipulate the vehicle 102 controls. In some examples, the available options may be based on the features specified in the policy data 138 as being enabled for the vehicle 102.

Figure 4B:
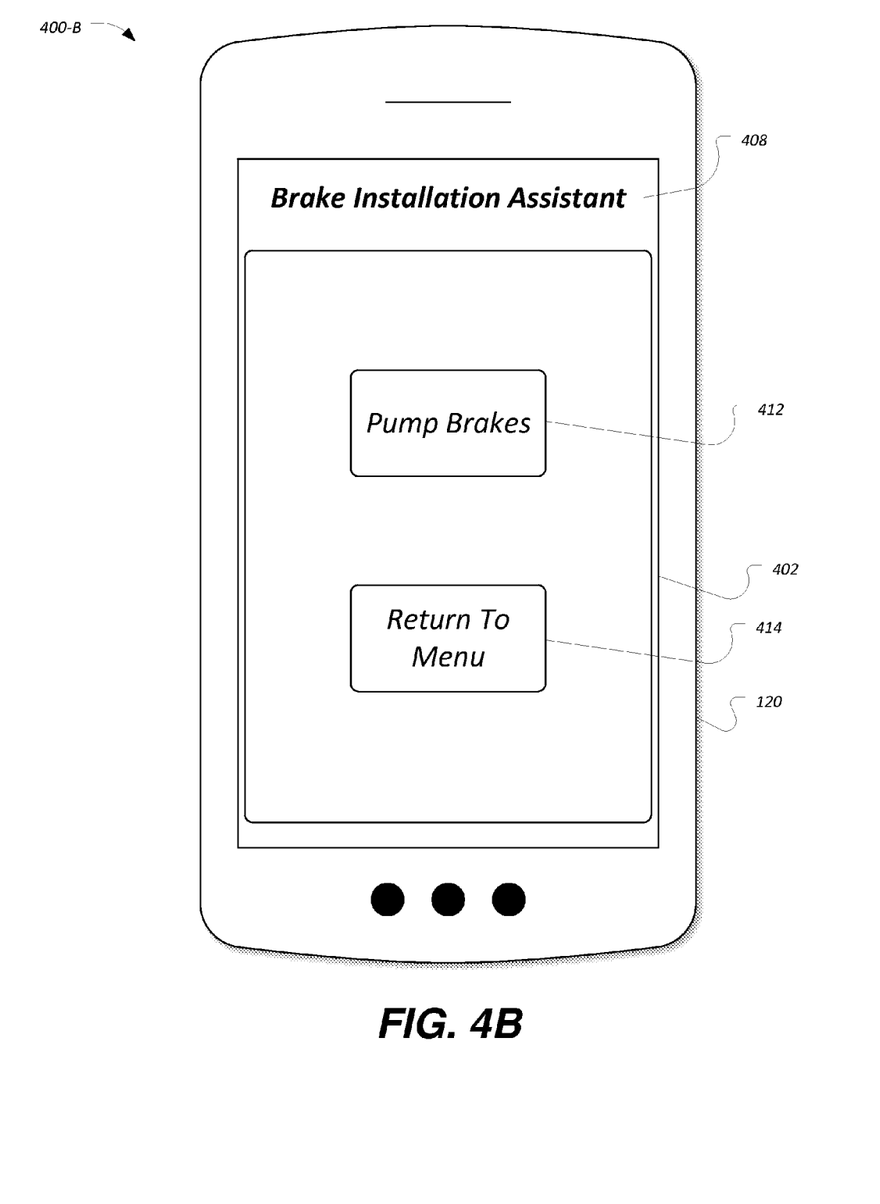
FIG. 4B illustrates an example user interface of the remote service application displaying a brake installation assistant.

FIG. 4B illustrates an example user interface 400-B of the remote service application 134 displaying a brake installation assistant. As with the user interface 400-A, the user interface 400-B may also be presented by the remote service application 134 on a display of the mobile device 120. The user interface 400-B may be invoked, in an example, responsive to user selection of the entry 406-A of the list control 404 of the user interface 400-A. As compared to the user interface 400-A, the title label 408 may indicate to the user that the user interface 400-B is displaying the brake installation assistant of the remote service application 134. Moreover, rather than the list control 404, the user interface 400-B may include a pump brakes button 412 that, when selected by the user, is configured to cause the remote service application 134 to send a command request 302 to the telematics control unit 116 requesting that the brake control module 106-C be sent an assistance command 304 to press the brakes. The user interface 400-B may also include a return to menu button 414 that, when selected by the user, is configured to cause the remote service application 134 to return to display of the menu user interface 400-A.

Figure 4C:
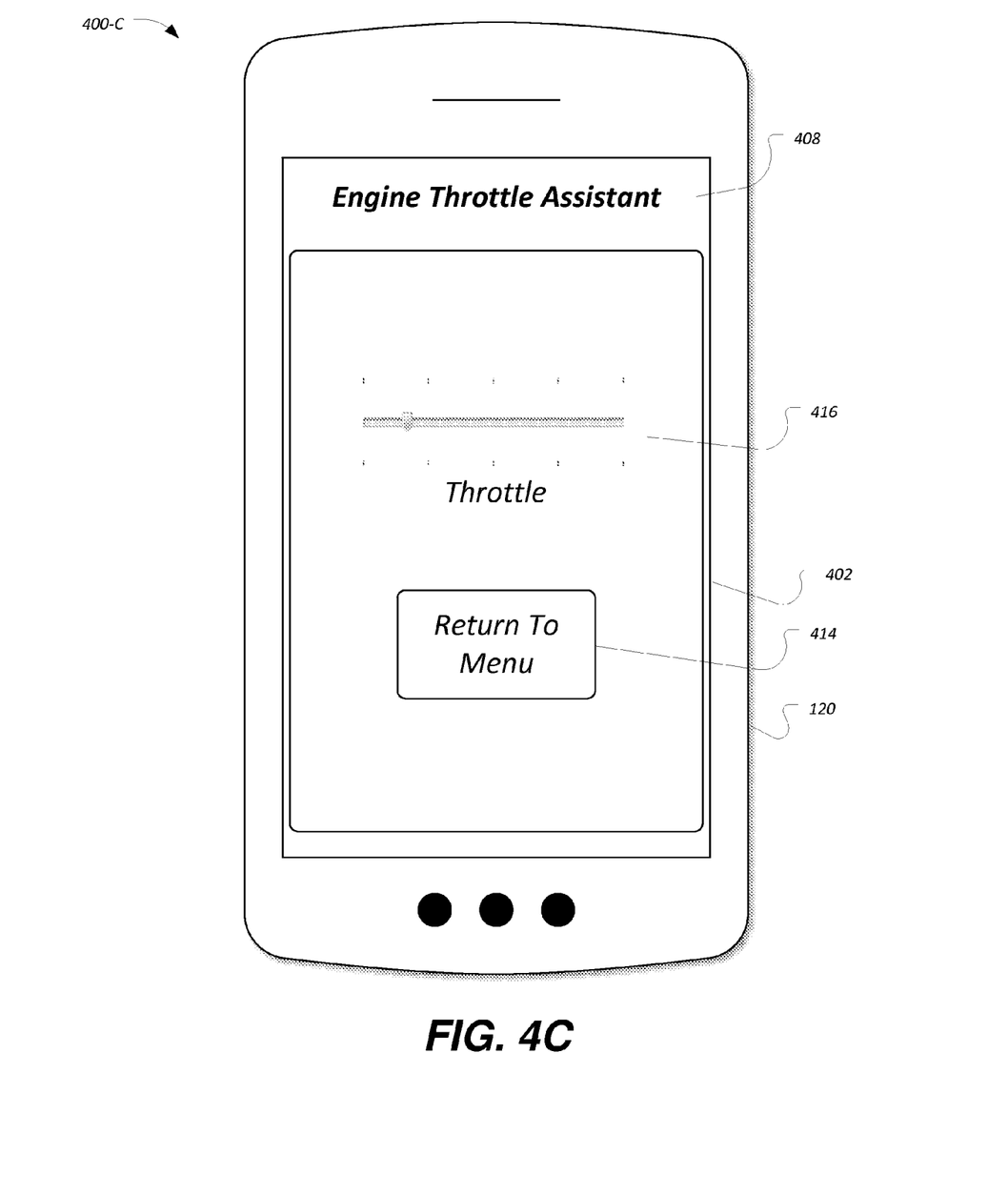
FIG. 4C illustrates an example user interface of the remote service application displaying an engine throttle assistant.

FIG. 4C illustrates an example user interface 400-C of the remote service application 134 displaying an engine throttle assistant. As with the user interfaces 400-A and 400-B, the user interface 400-C may also be presented by the remote service application 134 on a display of the mobile device 120. The user interface 400-C may be invoked, in an example, responsive to user selection of the entry 406-B of the list control 404 of the user interface 400-A. As compared to the user interfaces 400-A and 400-B, the title label 408 may indicate to the user that the user interface 400-B is displaying the engine throttle assistant of the remote service application 134. Moreover, rather than the list control 404, the user interface 400-C may include a throttle control 416 that, when may be used by the user to select a throttle setting for the vehicle 102. When the user make a change to the throttle setting using the throttle control 416, the remote service application 134 may send a command request 302 to the telematics control unit 116 requesting that the engine control module 106-C be sent an assistance command 304 to update the throttle. The user interface 400-C may also include a return to menu button 414 that, when selected by the user, is configured to cause the remote service application 134 to return to display of the menu user interface 400-A.

Figure 4D:
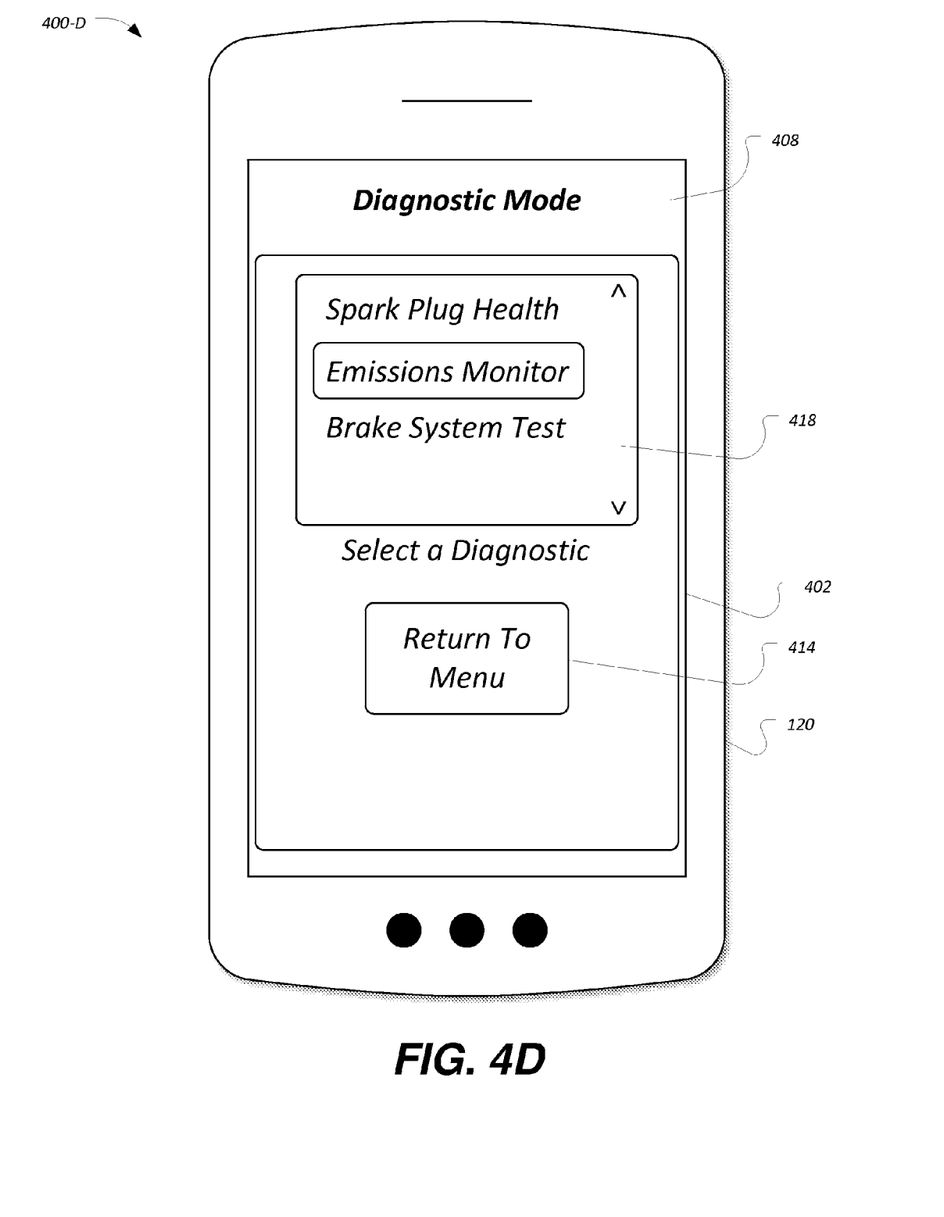
FIG. 4D illustrates an example user interface of the remote service application displaying an diagnostic menu.

FIG. 4D illustrates an example user interface 400-D of the remote service application 134 displaying an diagnostic menu. As with the user interfaces 400-A through 400-C, the user interface 400-D may also be presented by the remote service application 134 on a display of the mobile device 120. The user interface 400-D may be invoked, in an example, responsive to user selection of the entry 406-C of the list control 404 of the user interface 400-A. As compared to the user interfaces 400-A through 400-C, the title label 408 may indicate to the user that the user interface 400-B is displaying the diagnostic menu of the remote service application 134. Moreover, the user interface 400-C may include a diagnostic list control 418 that from which the user may select from available diagnostic routines 142 to be performed by the vehicle 102. The diagnostic routines 142 may be requested by the remote service application 134 from the remote server 136, and provided in the user interface 400-D for selection by the user. As some non-limiting possibilities, the diagnostic routines 142 may include routines for monitoring spark plug health, monitoring vehicle 102 emissions, and performing a brake system health test. When the user make a selection from the diagnostic list control 418, the remote service application 134 may send one or more command requests 302 to the telematics control unit 116 requesting that the information specified by the diagnostic routines 142 be captured as diagnostic data 140 to be provided to the remote server 136. The user interface 400-D may also include a return to menu button 414 that, when selected by the user, is configured to cause the remote service application 134 to return to display of the menu user interface 400-A.

Figure 5:
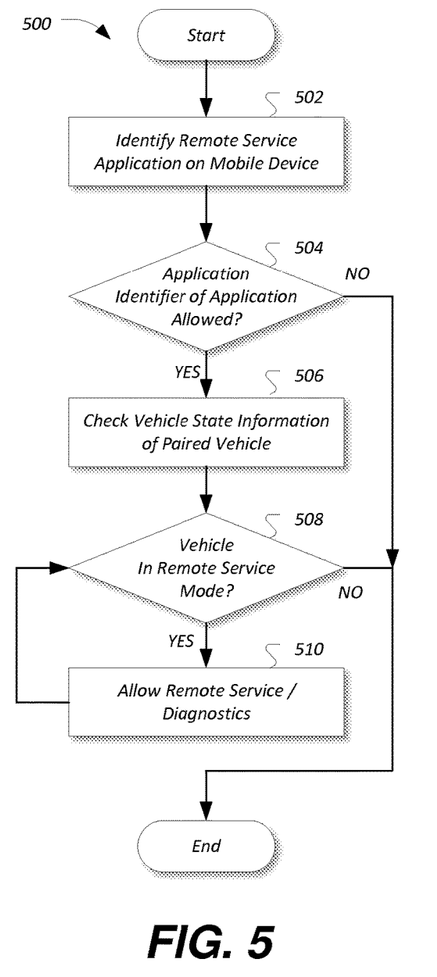
FIG. 5 illustrates an example process for authorization of the remote service application.

FIG. 5 illustrates an example process 500 for authorization of the remote service application 134. In an example, the process 500 may be performed by the telematics control unit 116 of the vehicle 102 in communication with the mobile device 120 and the remote server 136. The process 500 may be initiated, in an example, by a mechanic, owner, or other user pairing his or her mobile device 120 with the telematics control unit 116 of the vehicle 102 to be serviced.

At operation 502, the telematics control unit 116 identifies the remote service application 134 as present on the mobile device 120. In an example, connected vehicle telematics application installed to the mobile device 120 may be associated with an application identifier (e.g., provided from the vehicle manufacturer or other identifier management authority). When the remote service application 134 is first started or when the mobile device 120 pairs with the telematics control unit 116, the telematics control unit 116 may receive the application identifier of the remote service application 134.

At operation 504, the telematics control unit 116 validates an application identifier of the remote service application 134 for use with the vehicle 102. In an example, the telematics control unit 116 may utilize the policy data 138 to determine whether the remote service application 134 is allowed to run connected to the vehicle 102, and if so, which vehicle functions may be accessed by the remote service application 134. In some examples, the policy data 138 may be maintained in a storage of the telematics control unit 116. In another example, the policy data 138 may be from the remote server 136 to the vehicle 102 via the user's mobile device 120 that is paired with the vehicle 102 and executing the mobile applications. If the remote service application 134 is validated for use with the vehicle 102, control passes to operation 506. Otherwise, the process 500 ends.

At operation 506, the telematics control unit 116 checks the vehicle 102 state information of the paired vehicle 102. In an example, the telematics control unit 116 may receive a service request 202 from the remote service application 134, and may check the vehicle 102 state in order confirm that the vehicle 102 is in a mode appropriate for execution of the remote service application 134. For instance, telematics control unit 116 may send a module query message 204 through the firewall 122 and via the vehicle buses 108 to the vehicle ECUs 106, to receive module responses 206 from the vehicle ECUs 106 affirming or rejecting that the vehicle 102 is in a state suitable for use of the remote service application 134.

At operation 508, the telematics control unit 116 validates whether the vehicle 102 is in the remote service mode. If the telematics control unit 116 receives affirming module responses 206, the telematics control unit 116 may approve use of the remote service application 134. If, however the telematics control unit 116 receives one or more module responses 206 rejecting use of the remote service application 134, then the telematics control unit 116 may deny use of the remote service application 134. If the remote service mode is confirmed, control passes to operation 510. Otherwise, the process 500 ends.

Figure 6:
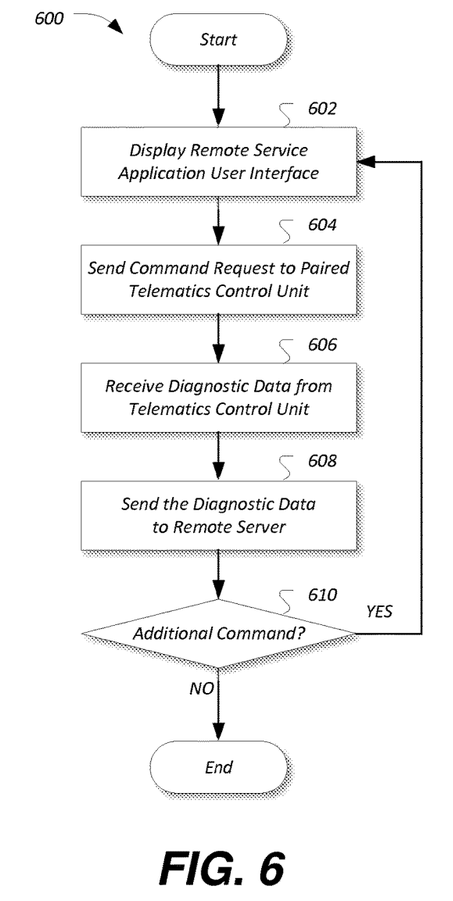
FIG. 6 illustrates an example process for utilizing the remote service application when the vehicle is in the remote service mode.

At operation 510, the telematics control unit 116 allows remote service and diagnostics to be performed to the vehicle 102 using the remote service application 134. Further details of the processing are described throughout and with respect to the process 600 below. After operation 510, control passes to operation 508. In other examples, after operation 510 the process 500 ends.

FIG. 6 illustrates an example process 600 for utilizing the remote service application 134 when the vehicle 102 is in the remote service mode. In an example, the process 600 may be performed by the mobile device 120 executing the remote service application 134 and in communication with the telematics control unit 116 and the remote server 136.

At operation 602, the mobile device 120 displays a user interface 400 of the remote service application 134. The user interface 400 may allow for the user to select command requests 302 to be provided to the telematics control unit 116. Example user interfaces 400-A, 400-B, and 400C provided to the display 402 of the mobile device 120 are discussed in detail above.

At operation 604, the mobile device 120 sends a command request 302 to the telematics control unit 116. In an example, the command request 302 may request that the brake control module 106-C be sent an assistance command 304 to press the brakes. In another example, the command request 302 may request that the engine control module 106-C be sent an assistance command 304 to update the throttle.

At operation 606, the mobile device 120 receives diagnostic data 140 from the telematics control unit 116. In an example, the diagnostic data 140 may include one or more of accelerator pedal position, steering wheel angle, vehicle speed, vehicle location (e.g., GPS coordinates, etc.), vehicle unique identifier (e.g., VIN), engine revolutions per minute (RPM), and vehicle HMI information, such as steering wheel button press information. In some examples the diagnostic data 140 may be captured by the mobile device 120 when the remote service application 134 is active and the vehicle 102 is in the remote service mode. In other examples, the diagnostic data 140 may be captured by the mobile device 120 for a predetermined period of time upon the command request 302 is sent to the telematics control unit 116 (e.g., five seconds, sixty seconds, etc.).

At operation 608, the mobile device 120 sends the diagnostic data 140 to the remote server 136. In many cases, the mobile device 120 may send the diagnostic data 140 to the remote server 136 via a Wi-Fi or other local network connection of the mobile device 120 to avoid without incurring cellular data charges to an in-vehicle modem (of so equipped) or to the mobile device 120. In other examples, the mobile device 120 may utilize a cellular or other connection of the mobile device 120 to send the diagnostic data 140 to the remote server 136.

At operation 610, the mobile device 120 determines whether to perform additional commands. In an example, the mobile device 120 may receive an indication from the user to quit or otherwise discontinue use of the remote service application 134 (e.g., due to a period of inactivity of the mobile device 120). If so, the process 600 may end. Otherwise, the mobile device 120 may await further user input, and control may return to operation 602.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a mobile device, external to a vehicle, configured to
authorize with a paired vehicle telematics control unit (TCU) configured to query a plurality of vehicle electronic control units (ECUs) to ensure permission to enter a vehicle remote service mode;
while in the service mode, send to the TCU a command request simulating manual input to in-cabin vehicle controls to request an operation be automatically performed by one of the (ECUs); and
receive diagnostic data from the ECUs via the TCU.

2. The system of claim 1, wherein the command request includes one of: (i) a request to a brake control module of the vehicle to invoke a brake actuator; (ii) a request to a powertrain control module of the vehicle to adjust an accelerator pedal setting; and (iii) a request to activate an external vehicle light.

3. The system of claim 1, wherein the mobile device is further configured to send an application identifier of a remote service application to the TCU for authorization.

4. The system of claim 1, wherein the mobile device is further configured to send diagnostic data received for a predetermined period of time after sending the command request to a remote server.

5. The system of claim 1, wherein the mobile device is further configured to send diagnostic data to a remote server when authorized with the paired TCU.

6. The system of claim 5, wherein the mobile device is further configured to:
connect to a local wireless network; and
send the diagnostic data over the local wireless network to the remote server.

7. The system of claim 1, wherein the remote service mode is set when at least one of: (i) the vehicle is in park, and (ii) a hood latch of the vehicle is open.

8. The system of claim 1, wherein the diagnostic data includes a collection of data provided by a plurality of vehicle electronic control units (ECUs) over a vehicle bus from which the TCU receives information.

9. A system comprising:
a plurality of electronic control units (ECUs) of a vehicle; and
a telematics control unit of the vehicle, configured to
query the ECUs to confirm the vehicle is in a remote service mode in which command requests from a remote service application of a mobile device external to the vehicle can be processed;
indicate the mode to the application; and receive a command request from the application to perform a service operation.

10. The system of claim 9, wherein the service operation includes one of: (i) a request to a brake ECU of the vehicle to invoke a brake actuator and (ii) a request to a powertrain ECU of the vehicle to adjust an accelerator pedal setting.

11. The system of claim 9, wherein the telematics control unit is further configured to access a vehicle bus over which the ECUs communicate through a firewall, wherein the firewall is configured to filter out service operation requests when the vehicle is not in the mode in which commands from the remote service application can be processed.

12. The system of claim 9, wherein the telematics control unit is further configured to collect diagnostic data provided by the plurality of the ECUs over a vehicle bus over which the plurality of the electronic control units communicate.

13. The system of claim 9, wherein the telematics control unit is further configured to receive module responses from the electronic control units responsive to the query, the module responses each indicating whether a respective one of the ECUs receiving the query affirms that the vehicle is in the mode in which commands from a remote service application of a mobile device can be processed.

14. The system of claim 9, wherein the telematics control unit is further configured to provide diagnostic data to the mobile device.

15. The system of claim 9, wherein the mode in which commands from a remote service application of a mobile device can be processed includes at least one of: (i) the vehicle being in park, and (ii) a hood of the vehicle being open.

16. A method comprising:
confirming that a remote service application of a mobile device connected to a telematics control unit of a vehicle is authorized to command the vehicle in a remote service mode in which service requests from the mobile device can be processed;
querying electronic control units of the vehicle to confirm the vehicle is in the remote service mode; and
sending diagnostic data to the mobile device when performing the service request.

17. The method of claim 16, further comprising:
responsive to identifying that the vehicle is in the remote service mode, indicating the mode to the mobile device.

18. The method of claim 17, further comprising creating the diagnostic data by collecting data provided by a plurality of electronic control units over the vehicle bus.

19. The method of claim 16, wherein the service request includes an identification of a diagnostic routine specifying the diagnostic data to be collected from the vehicle electronic control unit.

20. The method of claim 16, further comprising:
confirming that a service request received from the mobile device requesting an operation to be performed by a vehicle electronic control unit is permissible within the mode; and
using a firewall connected between the telematics control unit and a vehicle bus to which the vehicle electronic control unit is connected for filtering out the operation of the service request when the operation is impermissible within the mode.

* * * * *